United States Patent
Sugo et al.

(10) Patent No.: US 11,933,022 B2
(45) Date of Patent: Mar. 19, 2024

(54) TRACTOR

(71) Applicant: TOYOTA JIDOSHA KABUSHIKI KAISHA, Aichi-ken (JP)

(72) Inventors: Yuki Sugo, Toyota (JP); Masaki Numakura, Miyoshi (JP); Makoto Hirai, Toyota (JP); Taiga Higuchi, Toyota (JP); Tomohiro Sato, Tajimi (JP); Hiroyuki Azuma, Nagoya (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 279 days.

(21) Appl. No.: 17/680,293

(22) Filed: Feb. 25, 2022

(65) Prior Publication Data
US 2022/0282452 A1    Sep. 8, 2022

(30) Foreign Application Priority Data

Mar. 3, 2021 (JP) .................................. 2021-033465

(51) Int. Cl.
*E02F 9/20* (2006.01)
*A01B 29/00* (2006.01)
*E02F 3/36* (2006.01)
*H02K 7/14* (2006.01)

(52) U.S. Cl.
CPC .............. *E02F 9/207* (2013.01); *A01B 29/00* (2013.01); *E02F 3/3659* (2013.01); *E02F 9/2095* (2013.01); *H02K 7/14* (2013.01)

(58) Field of Classification Search
CPC ....... E02F 9/207; E02F 3/3659; E02F 9/2095; A01B 29/00; A01B 29/06; H02K 7/14; B60L 2240/423; B60L 50/60; B60L 2200/40; B60L 2240/647; B60L 15/32; B60L 15/38; B60L 2220/42; B60L 2240/42; B62D 49/00; B60S 1/68
USPC ......................................................... 701/50
See application file for complete search history.

(56) References Cited

U.S. PATENT DOCUMENTS

| | | | |
|---|---|---|---|
| 5,984,017 A * | 11/1999 | Packham | A01B 49/02 172/686 |
| 7,021,397 B2 * | 4/2006 | Pitonyak | A01B 73/044 172/311 |
| 10,315,489 B2 * | 6/2019 | Shimada | B62D 25/06 |
| 10,412,874 B2 * | 9/2019 | Post | A01B 61/046 |

(Continued)

FOREIGN PATENT DOCUMENTS

| | | |
|---|---|---|
| CN | 103732369 A | 4/2014 |
| JP | S6474909 A | 3/1989 |

(Continued)

*Primary Examiner* — Jaime Figueroa
(74) *Attorney, Agent, or Firm* — HAUPTMAN HAM, LLP (57) ABSTRACT

A tractor includes a working motor, a work machine including a roller configured to rotate by an output from the working motor, a support mechanism configured to support the work machine such that a working posture and a retracting posture are achievable, and a control device. The control device executes: an adherence amount acquisition process of acquiring an estimated adherence amount as an estimated value for the amount of mud attached to the roller; and a mud removal process of, when the estimated adherence amount is equal to or more than a determination adherence amount, removing the mud from the roller by driving the working motor in a state where the work machine takes the retracting posture.

5 Claims, 3 Drawing Sheets (56) References Cited

U.S. PATENT DOCUMENTS

| | | | |
|---|---|---|---|
| 10,988,185 B2 * | 4/2021 | Asada | B62D 25/165 |
| 2005/0028994 A1 * | 2/2005 | Pitonyak | A01B 73/044 |
| | | | 172/662 |
| 2006/0151186 A1 * | 7/2006 | Pitonyak | A01B 49/027 |
| | | | 172/311 |
| 2014/0198599 A1 | 7/2014 | Kamijo | |
| 2018/0134115 A1 * | 5/2018 | Shimada | B62D 49/00 |
| 2020/0283073 A1 * | 9/2020 | Asada | B62D 49/00 |

FOREIGN PATENT DOCUMENTS

| JP | H06-144322 A | 5/1994 |
|---|---|---|
| JP | 2003-019949 A | 1/2003 |
| JP | 2006-240377 A | 9/2006 |
| JP | 2014143965 A | 8/2014 |

\* cited by examiner

TRACTOR

CROSS-REFERENCE TO RELATED APPLICATION

This application claims priority to Japanese Patent Application No. 2021-033465 filed on Mar. 3, 2021, incorporated herein by reference in its entirety.

BACKGROUND

1. Technical Field

The present disclosure relates to a tractor including a work machine.

2. Description of Related Art

Japanese Unexamined Patent Application Publication No. 2014-143965 (JP 2014-143965 A) describes one example of a tractor including a work machine and an electric motor as a drive source for the work machine. In the tractor, the work machine includes a roller configured to rotate by an output from the electric motor. When the electric motor is driven in a state where the roller is pressed against the ground in a farm field such as a farm, the work machine can cultivate the farm field.

SUMMARY

When the work machine cultivates the farm field, mud is attached to the roller of the work machine.

Here, when the cultivation of the farm field is finished, the operator of the tractor may drive the tractor on a public road.

At this time, when much mud is attached to the roller of the work machine, the public road may get dirty with the mud falling from the roller at the time when the tractor is traveling.

A tractor achieved to solve the problem includes a vehicle body, an electric motor, a work machine, a support mechanism, and a control device. The work machine includes a rotating body configured to rotate by an output from the electric motor. The vehicle body is connected to the work machine via the support mechanism. The support mechanism is configured to support the work machine such that a working posture and a retracting posture are achievable, the working posture being a posture in which the rotating body makes contact with the ground, the retracting posture being a posture in which the rotating body is lifted up to a position distanced from a ground. The control device executes the following processes: a work process of causing the work machine to work by driving the electric motor in a state where the work machine takes the working posture; an adherence amount acquisition process of acquiring an estimated adherence amount as an estimated value for an amount of mud attached to the rotating body; and a mud removal process of, when the estimated adherence amount is equal to or more than a determination adherence amount, removing the mud from the rotating body by driving the electric motor in a state where the work machine takes the retracting posture.

By driving the electric motor in the state where the work machine takes the working posture, the work machine can be caused to work. When the adherence amount acquisition process is executed after the work of the work machine is ended, the estimated adherence amount as the estimated value for the amount of the mud attached to the rotating body is acquired. At this time, in a case where the estimated adherence amount is equal to or more than the determination adherence amount, the mud removal process is executed.

That is, in the above configuration, in a case where the amount of the mud attached to the rotating body is large after the work of the work machine is ended, the mud can be removed from the rotating body by the execution of the mud removal process. As a result, at the time when the tractor travels on a public road after that, it is possible to restrain the mud from falling to the public road from the work machine of the tractor. Accordingly, it is possible to restrain the public road from getting dirty at the time when the tractor travels on the public road.

In the tractor according to one aspect, in the adherence amount acquisition process, the control device may drive the electric motor in a state where the work machine takes the retracting posture, the control device may derive an inertia estimated value as an estimated value for inertia of the rotating body based on a torque of the electric motor and a change velocity of a rotation number of the electric motor to be obtained when the electric motor is driven in the state where the work machine takes the retracting posture, and the control device may acquire, as the estimated adherence amount, a value to be larger as the inertia estimated value is larger.

That the inertia estimated value of the rotating body is large means that the amount of the mud attached to the rotating body is large. In the above configuration, the inertia of the rotating body is estimated based on the torque of the electric motor and the change velocity of the rotation number of the electric motor at the time when the electric motor is driven. The estimated adherence amount is derived based on the estimation result of the inertia. That is, the estimated adherence amount can be acquired by driving the electric motor in a state where the rotating body is distanced from the ground.

In the tractor according to one aspect, in the mud removal process, the control device may alternately repeat a normal rotation control and a reverse rotation control, the normal rotation control being a control in which the electric motor is rotated in a forward direction, the reverse rotation control being a control in which the electric motor is rotated in a reverse direction.

In the above configuration, it is possible to remove the mud from the rotating body efficiently as compared with a case where the rotation direction of the electric motor is only one direction.

In the tractor according to one aspect, when the control device executes the mud removal process, the control device may execute a notification process of notifying that the mud removal process is to be executed.

In the above configuration, it is possible to notify the operator of the tractor or an operator present around the tractor that the mud is scattered from the work machine due to the execution of the mud removal process.

The tractor according to one aspect may include a second electric motor as a drive source for the support mechanism, when the electric motor is taken as a first electric motor. After the work process is ended, the control device may operate the support mechanism by driving the second electric motor and execute a retracting process of changing the work machine from the working posture to the retracting posture. After the work machine has changed to the retracting posture by the execution of the retracting process, the control device may execute the adherence amount acquisition process.

In the above configuration, when the work of the work machine is ended, the second electric motor is driven such that the work machine is automatically changed from the working posture to the retracting posture. When the rotating body is distanced from the ground by the change of the posture of the work machine, the estimated adherence amount is acquired by the execution of the adherence amount acquisition process. In a case where the estimated adherence amount is equal to or more than the determination adherence amount, the mud removal process is executed. That is, when the work of the work machine is ended, a series of processes to remove the mud from the rotating body is executed automatically.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

The following describes a first embodiment of a tractor with reference to FIGS. 1 to 4.

Overall Configuration

Figure 1:
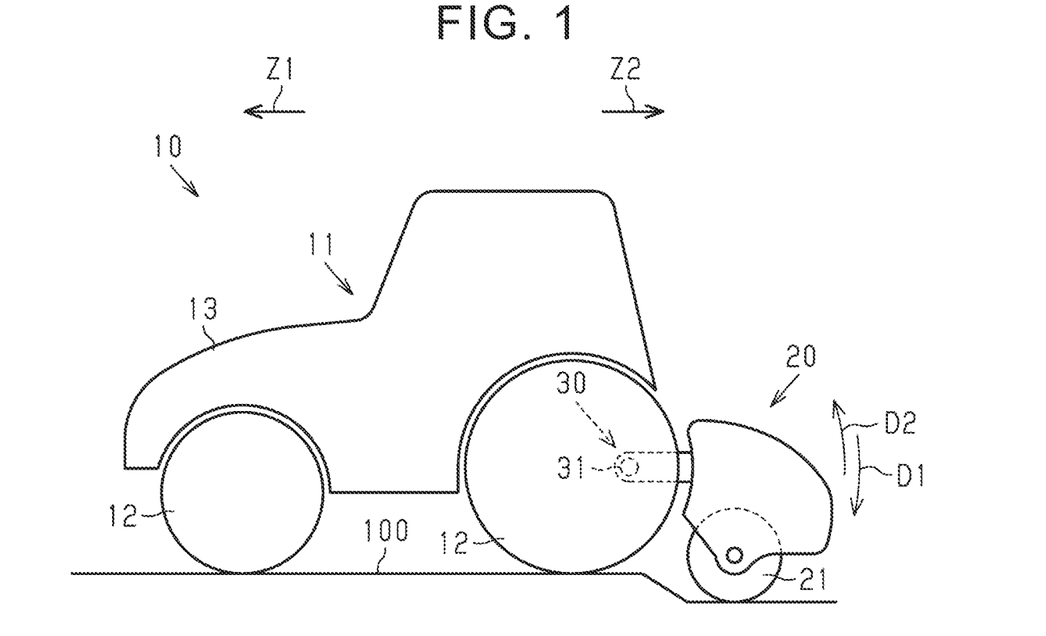
FIG. 1 is a schematic view of a tractor according to a first embodiment.
Figure 2:
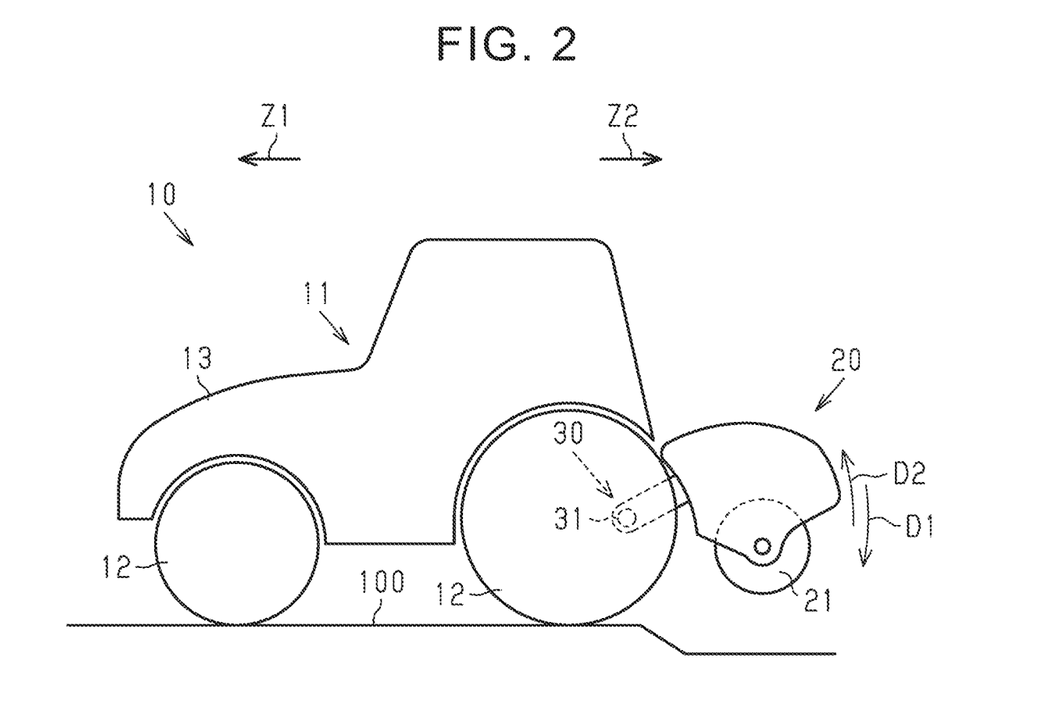
FIG. 2 is a schematic view of the tractor.

As illustrated in FIGS. 1, 2, a tractor 10 includes a vehicle 11 and a work machine 20 placed on a rear side Z2 from the vehicle 11. The vehicle 11 includes a plurality of wheels 12 and a vehicle body 13.

The work machine 20 includes a roller 21 as one example of a rotating body. The work machine 20 can cultivate a farm field by rotating the roller 21 in a state where the roller 21 makes contact with a ground 100 of the farm field. That is, the cultivation of the farm field by the work machine 20 is one example of the work of the work machine 20.

The tractor 10 includes a support mechanism 30 via which the vehicle body 13 is connected to the work machine 20. The support mechanism 30 includes a support shaft 31 extending in the lateral direction of the vehicle 11. The support mechanism 30 can turn the work machine 20 around the support shaft 31. That is, the work machine 20 is connected to the vehicle 11 by the support mechanism 30 such that the work machine 20 is displaceable in an approach direction D1 as a direction in which the roller 21 approaches the ground 100 and in a separation direction D2 as a direction in which the roller 21 is distanced from the ground 100. In other words, the support mechanism 30 supports the work machine 20 such that the work machine 20 can achieve a working posture in which the roller 21 makes contact with the ground 100 and a retracting posture in which the roller 21 is lifted up to a position distanced from the ground 100.

Figure 3:
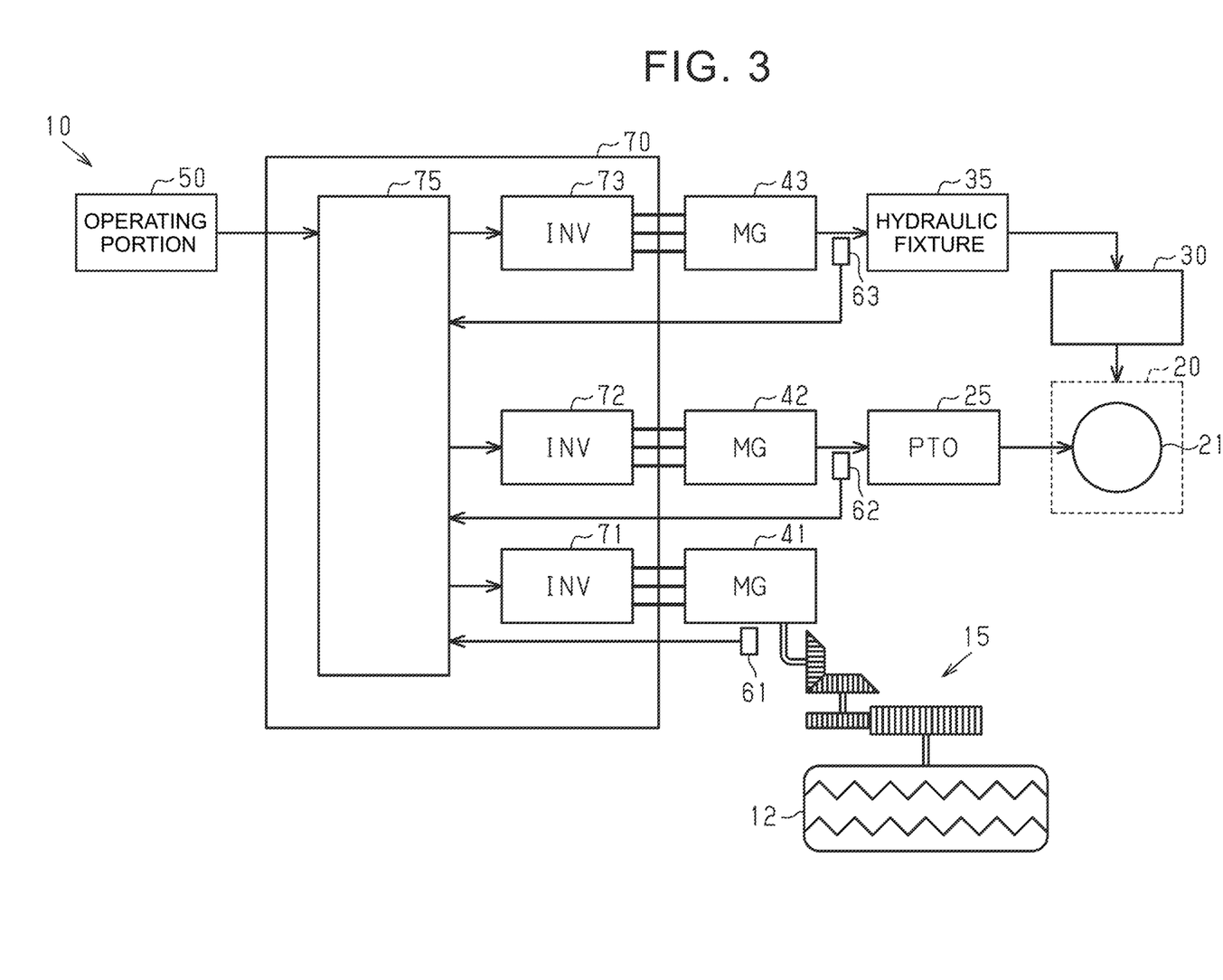
FIG. 3 is a block diagram illustrating a path of power transmission in the tractor and a control structure of the tractor.

As illustrated in FIG. 3, the tractor 10 includes a drive motor 41. An output torque from the drive motor 41 is transmitted to the wheels 12 via a power transmission mechanism 15. That is, the drive motor 41 is a motor configured to move the tractor 10.

The tractor 10 includes a working motor 42. An output torque from the working motor 42 is input into the roller 21 of the work machine 20 via a PTO 25. That is, when the working motor 42 is driven, the roller 21 can be rotated. In other words, when the working motor 42 is driven in a state where the roller 21 makes contact with the ground 100, the work machine 20 can cultivate the farm field. Accordingly, in the present embodiment, the working motor 42 corresponds to a "first electric motor." Note that the "PTO" represents a "power take-off."

The tractor 10 includes a displacement motor 43 and a hydraulic fixture 35. When the displacement motor 43 is driven, the hydraulic pressure to be caused by the hydraulic fixture 35 can be adjusted. When the hydraulic pressure to be caused by the hydraulic fixture 35 is adjusted, the support mechanism 30 can be operated. That is, when the hydraulic pressure is adjusted, the work machine 20 can be displaced in the approach direction D1 and in the separation direction D2. Accordingly, in the present embodiment, the displacement motor 43 corresponds to a "second electric motor" as a drive source for the support mechanism 30.

The tractor 10 includes an operating portion 50 to be operated by the operator of the tractor 10. The operating portion 50 includes a steering wheel and various operation switches, for example. A signal corresponding to an operation performed by the operator on the operating portion 50 is input into a control device 70 (described later).

Control Structure of Tractor 10

As illustrated in FIG. 3, the tractor 10 includes the control device 70 configured to control the motors 41 to 43. The control device 70 includes an inverter circuit 71 for the drive motor 41, an inverter circuit 72 for the working motor 42, and an inverter circuit 73 for the displacement motor 43.

The control device 70 includes a control circuit 75. The control circuit 75 includes, for example, a CPU, a ROM, and a storage device. In the ROM, a control program to be executed by the CPU is stored. In the storage device, a computing result from the CPU is stored.

A signal output from the operating portion 50 is input into the control circuit 75. Further, detection signals from various sensors are input into the control circuit 75. The sensors can include, for example, a first rotation angle sensor 61, a second rotation angle sensor 62, and a third rotation angle sensor 63. The first rotation angle sensor 61 outputs, as the detection signal, a signal corresponding to a first rotation number Nmg1 as the rotation speed of a rotor of the drive motor 41. The second rotation angle sensor 62 outputs, as the detection signal, a signal corresponding to a second rotation number Nmg2 as the rotation speed of a rotor of the working motor 42. The third rotation angle sensor 63 outputs, as the detection signal, a signal corresponding to a third rotation number Nmg3 as the rotation speed of a rotor of the displacement motor 43.

The control circuit 75 drives the drive motor 41 by operating the inverter circuit 71 based on the first rotation number Nmg1. Similarly, the control circuit 75 drives the working motor 42 by operating the inverter circuit 72 based on the second rotation number Nmg2. The control circuit 75 drives the displacement motor 43 by operating the inverter circuit 73 based on the third rotation number Nmg3.

The control circuit 75 executes an approach process of bringing the posture of the work machine 20 into the working posture. In the approach process, the control circuit 75 drives the displacement motor 43 to displace the work machine 20 in the approach direction D1 until the roller 21 is pressed against the ground 100. In a case where the roller 21 does not make contact with the ground 100, the output torque from the displacement motor 43 is not so large. However, after the roller 21 makes contact with the ground 100, the work machine 20 cannot be displaced in the approach direction D1 until the output torque from the displacement motor 43 is made large as compared to the output torque before the roller 21 makes contact with the ground 100. In view of this, in a case where the output torque from the displacement motor 43 is equal to or larger than a determination value, the control circuit 75 can determine that the roller 21 is pressed against the ground 100. Note that, in a case where the control circuit 75 receives a signal to execute the approach process from the operating portion 50, the control circuit 75 executes the approach process, for example.

The control circuit 75 executes a work process of causing the work machine 20 to work. In the work process, the control circuit 75 causes the work machine 20 to work by driving the working motor 42 in a state where the roller 21 makes contact with the ground 100. Further, when the control circuit 75 drives the drive motor 41, the tractor 10 is moved to a front side Z1 illustrated in FIGS. 1, 2. For example, in a case where the control circuit 75 receives a signal to execute the work process from the operating portion 50, the control circuit 75 executes the work process.

When the tractor 10 is moved during the execution of the work process as such, the control circuit 75 allows the work machine 20 to execute cultivation.

The control circuit 75 executes a retracting process of bringing the posture of the work machine 20 into a distanced posture. In the retracting process, the control circuit 75 drives the displacement motor 43 to displace the work machine 20 in the separation direction D2 until the roller 21 is distanced from the ground 100. For example, the control circuit 75 derives a lifting amount of the roller 21 to be lifted by driving of the displacement motor 43 based on the rotation angle of the rotor of the displacement motor 43. The control circuit 75 can determine whether the roller 21 is distanced from the ground 100 or not, based on the lifting amount thus derived. Note that, in a case where the control circuit 75 receives a signal to execute the retracting process from the operating portion 50, for example, the control circuit 75 executes the retracting process.

Procedure of Process to Remove Mud Attached to Roller 21

Figure 4:
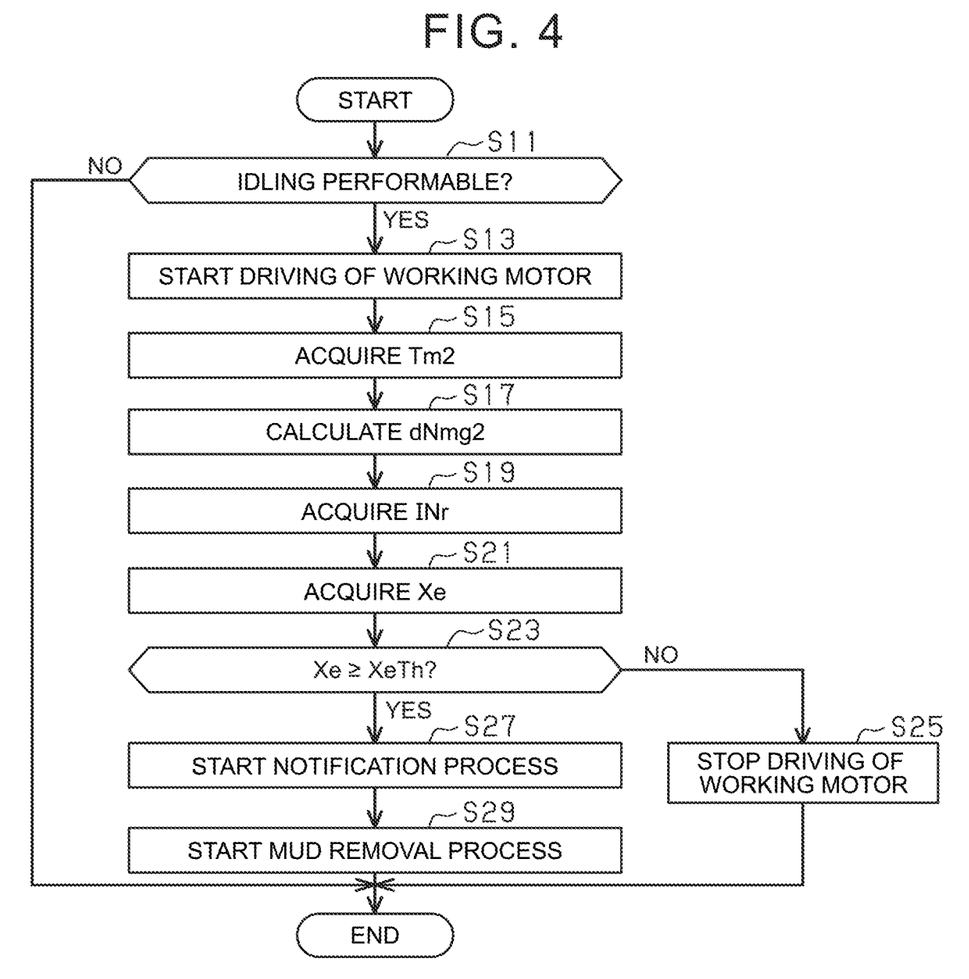
FIG. 4 is a flowchart to describe a series of processes to be executed in a control device of the tractor.

With reference to FIG. 4, the following describes the procedure of a series of processes to be executed by the control circuit 75 to remove mud attached to the roller 21. For example, the series of processes illustrated in FIG. 4 is executed by the control circuit 75 with the proviso that the control circuit 75 receives, from the operating portion 50, a signal to remove the mud from the roller 21.

In the series of processes, first in step S11, the control circuit 75 determines whether the roller 21 can be idled or not. In a case where the roller 21 is distanced from the ground 100, it can be considered that the roller 21 can be idled. In the meantime, in a case where the roller 21 makes contact with the ground 100, it cannot be considered that the roller 21 can be idled. For example, in a case where the retracting process is executed after the work process, the roller 21 is distanced from the ground 100, and therefore, the control circuit 75 determines that the roller 21 can be idled. In a case where the retracting process has not been executed after the end of the work process, the roller 21 is not distanced from the ground 100, and therefore, the control circuit 75 does not determine that the roller 21 can be idled. Further, the control circuit 75 may determine whether the roller 21 can be idled or not, based on the rotation angle of the rotor of the displacement motor 43.

In a case where the roller 21 makes contact with the ground 100 and therefore the control circuit 75 does not determine that the roller 21 can be idled (S11: NO), the control circuit 75 ends this processing routine once. In this case, the control circuit 75 should notify the operator that the work machine 20 is to be displaced in the separation direction D2. In the meantime, in step S11, in a case where the roller 21 is distanced from the ground 100 and therefore the control circuit 75 determines that the roller 21 can be idled (YES), the control circuit 75 advances the process to step S13.

In step S13, the control circuit 75 starts driving of the working motor 42. In the present embodiment, the control circuit 75 drives the working motor 42 based on a rotation number target value as a target value for the rotation number of the working motor 42 and the second rotation number Nmg2. That is, in a case where the second rotation number Nmg2 is lower than the rotation number target value, the control circuit 75 increases a requested torque Tm2 as a requested value for the output torque from the working motor 42. In a case where the second rotation number Nmg2 is higher than the rotation number target value, the control circuit 75 decreases the requested torque Tm2. In a case where the second rotation number Nmg2 coincides with the rotation number target value, the control circuit 75 maintains the requested torque Tm2. When the control circuit 75 starts driving of the working motor 42, the control circuit 75 advances the process to step S15.

In step S15, the control circuit 75 acquires the requested torque Tm2 as a torque for the working motor 42. Subsequently, in step S17, the control circuit 75 calculates a change velocity dNmg2 of the second rotation number Nmg2. For example, as the change velocity dNmg2, the control circuit 75 calculates a value obtained by differentiating the second rotation number Nmg2 with respect to time.

In subsequent step S19, the control circuit 75 acquires an inertia estimated value INr as an estimated value for the inertia of the roller 21 based on the requested torque Tm2 and the change velocity dNmg2. For example, in a case where the change velocity dNmg2 is the same, the control circuit 75 acquires, as the inertia estimated value INr, a value to be larger as the requested torque Tm2 is larger. For example, in a case where the requested torque Tm2 is the same, the control circuit 75 acquires, as the inertia estimated value INr, a value to be larger as the change velocity dNmg2 is smaller.

Subsequently, in step S21, the control circuit 75 acquires an estimated adherence amount Xe as an estimated value for the amount of mud attached to the roller 21. In the present embodiment, the control circuit 75 acquires, as the estimated adherence amount Xe, a value to be larger as the inertia estimated value INr is larger. Accordingly, steps S19, S21 correspond to an "adherence amount acquisition process."

Here, details of how to acquire the estimated adherence amount Xe will be described. In a case where mud is attached to the roller 21, it is necessary to input a large torque into the roller 21 to rotate the roller 21, as compared with a case where no mud is attached to the roller 21. In view of this, in a case where the inertia estimated value INr obtained when no foreign matter such as mud is attached to the roller 21 is taken as an inertia reference value INrb, the control circuit 75 derives a value obtained by subtracting the inertia reference value INrb from the inertia estimated value INr as a calculation value ΔIN, for example. The calculation value ΔIN relates to the amount of the mud attached to roller 21. On that account, the control circuit 75 derives, as the estimated adherence amount Xe, a value to be larger as the calculation value ΔIN is larger.

When the control circuit 75 acquires the estimated adherence amount Xe in step S21, the control circuit 75 advances the process to step S23. In step S23, the control circuit 75 determines whether or not the estimated adherence amount Xe is equal to or more than a determination adherence amount XeTh. The determination adherence amount XeTh is set as a determination reference based on which it is determined whether the amount of the mud attached to the roller 21 is large or not. That is, in a case where the tractor 10 travels on a public road in a state where the estimated adherence amount Xe is equal to or more than the determination adherence amount XeTh, the public road might get dirty with the mud falling from the roller 21 while the tractor 10 is traveling. On that account, in a case where the estimated adherence amount Xe is equal to or more than the determination adherence amount XeTh, it can be considered that it is necessary to remove the mud from the roller 21. In the meantime, in a case where the estimated adherence amount Xe is less than the determination adherence amount XeTh, it can be considered that it is not necessary to remove the mud from the roller 21.

In a case where the estimated adherence amount Xe is less than the determination adherence amount XeTh (S23: NO), the control circuit 75 advances the process to step S25. In step S25, the control circuit 75 stops the driving of the working motor 42. Hereby, the rotation of the roller 21 is stopped. Then, the control circuit 75 ends the series of processes.

In the meantime, in a case where the control circuit 75 determines, in step S23, that the estimated adherence amount Xe is equal to or more than the determination adherence amount XeTh (YES), the control circuit 75 advances the process to step S27. In step S27, the control circuit 75 executes a notification process of notifying that a mud removal process (described later) is to be executed. For example, the control circuit 75 operates a notification device provided in the tractor 10, so that the operator of the tractor 10 and an operator present around the tractor 10 are notified that the mud removal process is to be executed. When the notification process is started, the control circuit 75 advances the process to step S29.

In step S29, the control circuit 75 starts the mud removal process. The mud removal process is a process to remove the mud from the roller 21 by driving the working motor 42 in a state where the roller 21 is distanced from the ground 100, that is, in a state where the posture of the work machine 20 is the retracting posture.

In the present embodiment, the control circuit 75 alternately repeats a normal rotation control and a reverse rotation control in the mud removal process. In the normal rotation control, the control circuit 75 drives the working motor 42 such that the rotor of the working motor 42 rotates in a forward direction. In the reverse rotation control, the control circuit 75 drives the working motor 42 such that the rotor of the working motor 42 rotates in a reverse direction reverse to the forward direction. For example, the control circuit 75 executes the mud removal process during a predetermined time that is determined in advance.

When the mud removal process is started, the control circuit 75 ends the series of processes.

Note that, in a case where the mud removal process and the notification process are started through the execution of the series of processes illustrated in FIG. 4, when an end condition for the mud removal process is established, the control circuit 75 ends the mud removal process and the notification process.

Operations and Effects in Present Embodiment

When the cultivation of the farm field by the work machine 20 is finished, the operator operates the operating portion 50 so as to displace the work machine 20 in the separation direction D2. Then, the retracting process is executed, so that the work machine 20 is displaced in the separation direction D2. Hereby, the roller 21 can be distanced from the ground 100. That is, the posture of the work machine 20 is changed from the working posture to the retracting posture.

When the operator operates the operating portion 50 so as to remove the mud from the roller 21, the adherence amount acquisition process is executed. Hereby, the estimated adherence amount Xe is acquired as an estimated value for the amount of the mud attached to the roller 21. In a case where the estimated adherence amount Xe is equal to or more than the determination adherence amount XeTh, the mud removal process is started. In the mud removal process, the roller 21 rotates in a state where the roller 21 is distanced from the ground 100. As a result, the mud is removed from the roller 21. That is, in a case where the amount of the mud attached to the roller 21 is large after the work of the work machine 20 is ended, the mud is removed from the roller 21 by the execution of the mud removal process.

On that account, at the time when the tractor 10 travels on the public road after that, it is possible to restrain the mud from falling to the public road from the work machine 20 of the tractor 10. Accordingly, it is possible to restrain the public road from getting dirty at the time when the tractor 10 travels on the public road.

Note that the present embodiment can further achieve the following effects.

(1-1) The inertia estimated value INr as an estimated value for the inertia of the roller 21 is derived based on the requested torque Tm2 and the change velocity dNmg2 of the second rotation number Nmg2 at the time when the working motor 42 is driven. The estimated adherence amount Xe is derived based on the inertia estimated value INr. That is, the estimated adherence amount Xe can be acquired by driving the work machine 20 in a state where the roller 21 is distanced from the ground 100. Accordingly, it is not necessary to provide the tractor 10 with an exclusive detection system for detecting the adherence amount of the mud attached to the roller 21.

(1-2) When the mud removal process is executed, the rotation of the roller 21 in a first rotation direction and the rotation of the roller 21 in a second rotation direction are executed alternately. The second rotation direction is a direction reverse to the first rotation direction. Hereby, it is possible to remove the mud from the roller 21 efficiently as compared with a case where the rotation direction of the roller 21 is not changed.

(1-3) During the execution of the mud removal process, the mud is scattered from the work machine 20. In this regard, in the present embodiment, the notification process is executed during the execution of the mud removal process. That is, it is possible to notify the operator of the tractor 10 or the operator present around the tractor 10 that the mud is scattered from the work machine 20 due to the execution of the mud removal process.

(1-4) In the present embodiment, in a case where the estimated adherence amount Xe acquired in the adherence amount acquisition process is less than the determination adherence amount XeTh, the mud removal process is not executed. That is, in a case where the amount of the mud attached to the roller 21 is small and it can be presumed that the mud does not fall from the work machine 20 so much even when the tractor 10 travels on the public road, the mud removal process is not executed. Accordingly, it is possible to restrain the mud removal process from being executed unnecessarily. Further, it is possible to restrain an increase in the number of times of execution of the mud removal process, and therefore, it is possible to restrain an increase in power consumption in the tractor 10 by just that much.

Second Embodiment

A second embodiment of the tractor 10 will be described with reference to FIG. 5. In the following description, parts different from the first embodiment will be mainly described, and the same constituent as or a constituent equivalent to a constituent described in the first embodiment has the same reference sign as the constituent described in the first embodiment, and a redundant description about the constituent will be omitted.

In the second embodiment, when the work process of causing the work machine 20 to perform cultivation is ended, the adherence amount acquisition process and the mud removal process are executed automatically.

Figure 5:
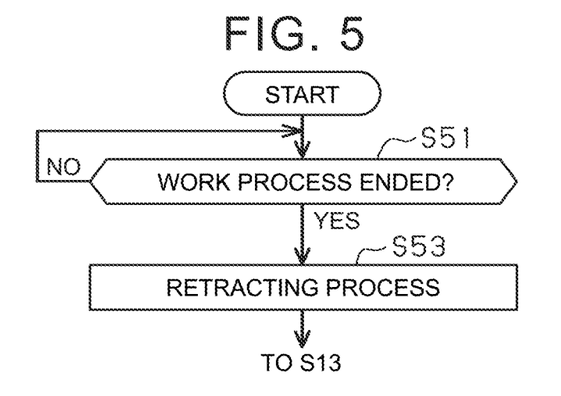
FIG. 5 is a flowchart to describe part of a series of processes to be executed in a control device of a tractor according to a second embodiment.

FIG. 5 illustrate part of the procedure of a series of processes to be executed by the control circuit 75 after the work process is ended. Note that the series of processes illustrated in FIG. 5 is started with the execution of the work process.

In the series of processes, first in step S51, the control circuit 75 determines whether or not the execution of the work process is ended. In a case where the execution of the work process has not been ended yet (S51: NO), the control circuit 75 executes the determination of step S51 repeatedly until the execution of the work process is ended. In the meantime, in a case where the execution of the work process is ended (S51: YES), the control circuit 75 advances the process to step S53.

In step S53, the control circuit 75 executes the retracting process. Then, when the roller 21 is distanced from the ground 100 by displacement of the work machine 20 in the separation direction D2 due to the execution of the retracting process, the control circuit 75 advances the process to step S13 described above. The processes to be executed after step S13 are similar to the first embodiment. On that account, details of those processes will not be described herein.

The present embodiment can further achieve the following effect in addition to effects equivalent to those of the first embodiment.

(2-1) When the cultivation by the work machine 20 is ended, the retracting process is executed, so that the work machine 20 is displaced automatically in the separation direction D2. That is, the posture of the work machine 20 is automatically changed from the working posture to the retracting posture. When the roller 21 is distanced from the ground 100 by the change of the posture of the work machine 20, the adherence amount acquisition process is executed, so that the estimated adherence amount Xe is acquired. Then, in a case where the estimated adherence amount Xe is equal to or more than the determination adherence amount XeTh, the mud removal process is executed. That is, when the cultivation by the work machine 20 is ended, the series of processes to remove the mud from the roller 21 is executed automatically. That is, it is possible to restrain an increase in troubles for the operation to be performed by the operator.

Modifications

The embodiments can also be carried out by adding changes as stated below. The embodiments and the following modifications can be carried out in combination as long as they do not cause any technical inconsistencies.

The notification process may not be executed.

The execute time of the mud removal process may be changeable. For example, the execute time of the mud removal process may be made longer as the estimated adherence amount Xe is larger. Further, the adherence amount acquisition process may be also executed during the execution of the mud removal process, and when the estimated adherence amount Xe becomes less than an end determination value, the mud removal process may be ended. In this case, a value smaller than the determination adherence amount XeTh should be set as the end determination value.

The mud removal process may not be a process of alternately repeating the normal rotation control and the reverse rotation control, provided that the mud can be removed from the roller 21. For example, in the mud removal process, the rotation direction of the rotor of the working motor 42 may not be changed in the middle of the mud removal process.

The torque of the working motor 42 to be acquired in step S15 may be the output torque from the working motor 42 that is calculated based on a motor current value that is a value indicative of a current flowing through the working motor 42.

The adherence amount acquisition process may be a process of acquiring the estimated adherence amount Xe by a technique different from the techniques described in the above embodiments. It can be presumed that more mud is attached to the roller 21 as the execution time of the cultivation by the work machine 20 is longer. On that account, a value to be larger as the execution time of the cultivation by the work machine 20 is longer may be acquired as the estimated adherence amount Xe.

Further, the adherence amount of the mud attached to the roller 21 may be estimated such that a camera configured to capture an image of the roller 21 is provided in the tractor 10, and data of the image captured by the camera is analyzed.

In a case where the estimated adherence amount Xe acquired in the adherence amount acquisition process is equal to or more than the determination adherence amount XeTh, the operator of the tractor 10 may be notified of this. In this case, when the operator who has received the notification operates the operating portion 50 so as to permit the execution of the mud removal process, the mud removal process may be executed.

In the first embodiment, the tractor 10 may not include the displacement motor 43. In this case, the operator of the tractor 10 may manually change the posture of the work machine 20.

The tractor 10 may include an engine as a power source for the tractor 10.

In each of the above embodiments, the motor configured to rotate the roller 21 and the motor configured to displace the work machine 20 are provided separately, but the present disclosure is not limited to this. For example, the tractor may be configured to use the motor configured to rotate the roller 21 as a power source for displacing the work machine 20. In this case, the tractor may be provided with a switching device configured to switch between a path via which the output of the motor is transmitted to the roller 21 and a path via which the output of the motor is transmitted to the support mechanism 30.

The control circuit 75 is not limited to a circuit including a CPU and a memory in which a program is stored and configured to execute a software process. That is, the control circuit 75 should have any of the following configurations (a) to (c).

(a) The control circuit 75 includes one or more processors configured to execute various processes in accordance with a computer program. The processor includes a CPU and a memory such as a RAM or a ROM. A program code or a command configured to cause the CPU to execute a process is stored in the memory. The memory, that is, a computer-readable medium includes all available media accessible by a general-purpose or exclusive computer.

(b) The control circuit 75 includes one or more exclusive hardware circuitry configured to execute various processes. The exclusive hardware circuitry can include, for example, an application specific integrated circuit, namely, ASIC, or FPGA. Note that the "ASIC" is an abbreviation of Application Specific Integrated Circuit, and the "FPGA" is an abbreviation of Field-Programmable Gate Array.

(c) The control circuit 75 includes a processor configured to execute some of various processes in accordance with a computer program, and an exclusive hardware circuitry configured to execute remaining processes of the various processes.

What is claimed is:

1. A tractor comprising:
    a vehicle body;
    an electric motor;
    a work machine including a rotating body configured to rotate by an output from the electric motor;
    a support mechanism via which the vehicle body is connected to the work machine, the support mechanism being configured to support the work machine such that a working posture and a retracting posture are achievable, the working posture being a posture in which the rotating body makes contact with the ground, the retracting posture being a posture in which the rotating body is lifted up to a position distanced from a ground; and
    a control device, wherein the control device executes the following processes:
    a work process of causing the work machine to work by driving the electric motor in a state where the work machine takes the working posture;
    an adherence amount acquisition process of acquiring an estimated adherence amount as an estimated value for an amount of mud attached to the rotating body; and
    a mud removal process of, when the estimated adherence amount is equal to or more than a determination adherence amount, removing the mud from the rotating body by driving the electric motor in a state where the work machine takes the retracting posture.

2. The tractor according to claim 1, wherein, in the adherence amount acquisition process, the control device drives the electric motor in a state where the work machine takes the retracting posture, the control device derives an inertia estimated value as an estimated value for inertia of the rotating body based on a torque of the electric motor and a change velocity of a rotation number of the electric motor to be obtained when the electric motor is driven in the state where the work machine takes the retracting posture, and the control device acquires, as the estimated adherence amount, a value to be larger as the inertia estimated value is larger.

3. The tractor according to claim 2, wherein, in the mud removal process, the control device alternately repeats a normal rotation control and a reverse rotation control, the normal rotation control being a control in which the electric motor is rotated in a forward direction, the reverse rotation control being a control in which the electric motor is rotated in a reverse direction.

4. The tractor according to claim 1, wherein, when the control device executes the mud removal process, the control device executes a notification process of notifying that the mud removal process is to be executed.

5. The tractor according to claim 1, comprising a second electric motor as a drive source for the support mechanism, when the electric motor is taken as a first electric motor, wherein:
    after the work process is ended, the control device operates the support mechanism by driving the second electric motor and executes a retracting process of changing the work machine from the working posture to the retracting posture; and
    after the work machine has changed to the retracting posture by the execution of the retracting process, the control device executes the adherence amount acquisition process.

* * * * *